United States Patent [19]

Nasser

[11] 4,335,741
[45] Jun. 22, 1982

[54] FLUID LEVEL CONTROLLER

[76] Inventor: Karim W. Nasser, 204 Garrison Crescent, Saskatoon, Saskatchewan, Canada

[21] Appl. No.: 233,513

[22] Filed: Feb. 11, 1981

[51] Int. Cl.³ .................. F16K 31/22; F16K 31/26
[52] U.S. Cl. .................................. 137/426; 137/444; 137/446
[58] Field of Search .............. 137/426, 434, 444, 445, 137/446, 442; 119/80

[56] References Cited

U.S. PATENT DOCUMENTS

| | | | |
|---|---|---|---|
| 1,107,268 | 8/1914 | Davis | 137/426 |
| 1,600,670 | 9/1926 | Hess | 137/426 |
| 1,972,331 | 9/1934 | Dean | 137/426 |
| 3,331,387 | 7/1967 | Walters | 137/426 |

Primary Examiner—George L. Walton
Attorney, Agent, or Firm—Stanley G. Ade

[57] ABSTRACT

The fluid level controller includes a control valve rod with a flotation element depending therefrom so that as the fluid level rises, the float rises and actuates the control valve in one direction at a predetermined level and when the float descends, the control valve is actuated to the proper center position. The rod is screw threaded and a connector element for the float engages the rod for sliding movement therealong with wing nuts being provided on each side thereof to clamp the connector element in the desired position along the rod. The connector element is also vertically slotted and engages over the rod via the slot. This slot allows vertical adjustment of the float within the limits of the slot and is clamped with the wing nuts in the desired vertical relationship so that adjustment can take place longitudinally and vertically by the same wing nuts.

4 Claims, 2 Drawing Figures

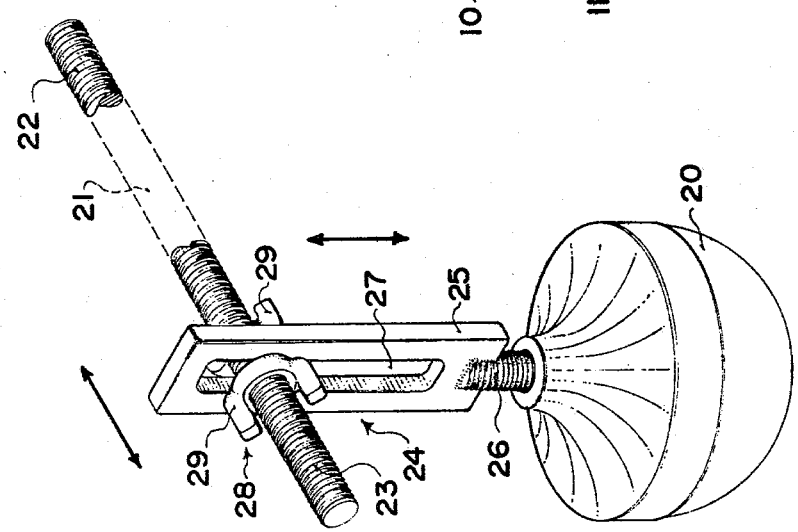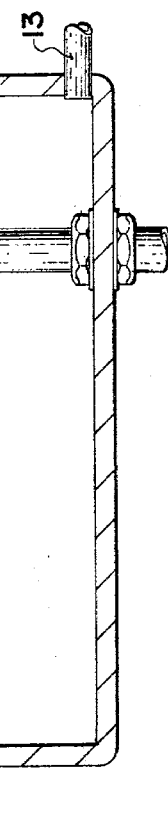
FIG. 1
FIG. 2

FLUID LEVEL CONTROLLER

BACKGROUND OF THE INVENTION

This invention relates to new and useful improvements in fluid level controllers, such as may be used in water supply tanks, flushing devices, oil tanks, stock watering tanks and the like controllable by valve operated by a flotation device such as a float.

The closest prior art known to the applicant are U.S. Pat. Nos. 1,980,430 and 1,600,670. The latter is adjusted by sliding the float rod along a slotted valve control rod and is vertically adjusted by screw theadably varying the position of the float relative to the rod carrying the float so that two adjustments are required.

The former patent namely U.S. Pat. No. 1,980,430 provides vertical adjustment of the float by screw theadably moving the float relative to its rod and horizontal adjustment by selectively positioning the float rod in any one of a plurality of apertures in the float control rod so that only coarse adjustment is possible.

SUMMARY OF THE INVENTION

The present invention overcomes disadvantages inherent in such devices by providing a mounting for the flotation element which is adjustable along the length of the rod and in a direction perpendicular to the length of the rod, by a common clamping element on the rod cooperating with the flotation means carrier or connector.

In accordance with the invention there is provided in a fluid level control device operatively connectable to a source of fluid and adapted to operate a valve to open and close the source of fluid; comprising in combination a rod operatively connected by adjacent one end thereof to the valve, a float element, a connector element detachably securing said float element to said rod along the length thereof, and detachable clamping means cooperating between said rod and said connector element for adjusting the position of said connector element along the length of said rod and also adjusting said connector element perpendicularly with relation to the longitudinal axis of said rod.

Another advantage of the present invention is that an infinite adjustment of the flotation means can be made, within limits, along the length of the rod and also perpendicular to the length of the rod, said adjustment being by the same clamping means thus giving considerable flexibility to the action of the valve controlled by the valve control rod and flotation means.

Yet another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is an isometric view of the control rod, the flotation means and the invention connecting same together.

FIG. 2 is a schematic vertical section showing one example of the use of the fluid level controller.

In the drawings like characters of reference indicate corresponding parts in the different figures.

DETAILED DESCRIPTION

Proceeding therefore to describe the invention in detail, reference should first be made to FIG. 2 in which 10 illustrates any fluid holding tank having fluid 11 therein required to be maintained at a relatively constant level such as that indicated by reference character 12. Such a tank may be in the form of a stock tank in which the level may fall due to the withdrawal of water from the tank, or in which the level may fall by any discharge means such as that illustrated schematically by reference character 13 which may be controlled by any conventional means such as a valve (not illustrated) or a flush control mechanism (also not illustrated) all of which are conventional.

A valve assembly is provided collectively designated 14 controlling the entrance of fluid to the tank 10 through a fluid conveying conduit 15 and as such valve mechanism is conventional, it is not believed necessary to describe same further except to say that a valve is controlled by a vertically moving rod or valve stem 16 pivotally secured to a member 17 which in turn is pivotally secured to an offstanding lug 18 by means of pivot pin 19, once again all of such structure being conventional.

The valve is controlled by means of a flotation means such as a float 20 which moves up and down responsive to variations in the fluid level 12. For example, if the level 12 falls, the float will descend opening the valve 14 thus letting fluid into the tank until level 12 is returned to the desired position at which point the float has moved upwardly sufficiently to shut off or close the valve 14. However, such action is purely exemplary.

Reference to FIG. 1 will show details of the invention which includes a valve control rod 21 having one end 22 screw threaded so that it may be screw theadably secured within member 17 or held therein by any other conventional means such as a clamping screw (not illustrated).

The distal or other end portion 23 of the rod 21 is also screw threaded along at least part of the length thereto and it is desirable that the entire rod 21 be screw threaded as illustrated.

A connector element is provided collectively designated 24 which takes the form of a slider plate or elongated member 25 having a screw threaded portion 26 extending downwardly therefrom to screw theadably receive the aforementioned float 20 as clearly shown.

The element 25 is also provided with an elongated closed ended slot 27 substantially parallel with the longitudinal axis of the element and lying therealong, said slot having a width sufficient to allow free sliding movement either lengthwise along the rod 21 or in a direction perpendicular thereto, it being understood that the connector element 24 engages over the rod 21 by means of the aforementioned elongated slot 27.

Detachable clamping means collectively designated 28 are provided and preferably take the form of a pair of wing nuts 29 or the like screw threadably engaging the portion 23 of the rod 21, one upon each side of the connector element 24 so that when these two wing nuts 29 are rotated in opposite directions, they serve to clamp the element 24 therebetween in the desired location along the length of the rod 21 and of course in the desired position perpendicular to the longitudinal axis of the rod 21.

This means that when installed as a fluid level controller, the float 20 may be positioned anywhere along the screw threaded length of the rod 21 as desired and in a position relative to the rod, in a direction perpendicular to the longitudinal axis thereof within the limits of the length of the elongated slot 27 thus giving infinite adjustability in two planes within the limits of the construction.

This enables the float element 20 to be positioned as desired relative to the valve assembly 14 and also to control the operating characteristics of the float relative to the valve 14 with fine fluid level adjustments 12 being provided by the position of the connector element 24 perpendicular to the longitudinal axis of the rod.

The position in the two planes is relatively simple and controlled by the same clamping assembly, namely the wing nuts 29 or the equivalent.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A fluid level control device operatively connectable to a source of fluid and adapted to operate a valve to open and close the source of fluid; comprising in combination a rod operatively connected by adjacent one end thereof to the valve, a float element, a connector element detachably securing said float element to said rod along the length thereof, and detachable clamping means cooperating between said rod and said connector element for adjusting the position of said connector element along the length of said rod and also adjusting said connector element perpendicularly with relation to the longitudinal axis of said rod, said connector element including an elongated member, means to mount said elongated member for said movement perpendicular to the axis of said rod, said means to mount said elongated member including a slot formed through said elongated member parallel to the longitudinal axis thereof thereby mounting said member upon said rod for said movement perpendicular to the longitudinal axis of said rod.

2. The device according to claim 1 in which said means to mount said elongated member for said movement perpendicular to the axis of said rod also mounts said elongated member for longitudinal movement along said rod.

3. The device according to claim 2 in which said means to mount said elongated member includes said slot formed through said elongated member parallel to the longitudinal axis thereof thereby mounting said elongated member upon said rod for said free sliding movement along said rod.

4. The device according to claims 1, 2 or 3 in which said rod is screw threaded along part of the length thereof, said detachable clamping means comprising a pair of screw theaded elements screw theadably engaging said rod one upon each side of said connector element for detachably clamping said connector element therebetween at the desired location along said rod and in the desired relationship perpendicular to the longitudinal axis of said rod.

* * * * *